(12) United States Patent
Ahmad et al.

(10) Patent No.: US 12,723,655 B2
(45) Date of Patent: Sep. 1, 2026

(54) SEALING RING HAVING OVERLAPPING SEALING PARTS, AND STATOR ARRANGEMENT HAVING SAME

(71) Applicant: Siemens Energy Global GmbH & Co. KG, Munich (DE)

(72) Inventors: Fathi Ahmad, Kaarst (DE); Olivier Gand, Düsseldorf (DE); Ralph Gossilin, Gladbeck (DE); Nihal Kurt, Düsseldorf (DE); Stephan Schwarz, Düsseldorf (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 18/867,456

(22) PCT Filed: May 26, 2023

(86) PCT No.: PCT/EP2023/064153
§ 371 (c)(1),
(2) Date: Nov. 20, 2024

(87) PCT Pub. No.: WO2023/232661
PCT Pub. Date: Dec. 7, 2023

(65) Prior Publication Data

US 2025/0369516 A1 Dec. 4, 2025

(30) Foreign Application Priority Data

Jun. 2, 2022 (DE) ..................... 10 2022 205 646.9

(51) Int. Cl.
*F16J 15/3284* (2016.01)
*F01D 11/00* (2006.01)

(52) U.S. Cl.
CPC ......... *F16J 15/3284* (2013.01); *F01D 11/005* (2013.01); *F05D 2240/55* (2013.01)

(58) Field of Classification Search
CPC ........ F16J 15/3284; F16J 15/02; F16J 15/022; F16J 15/06; F16J 15/061; F16J 15/067; F16J 15/08; F01D 11/005; F05D 2240/55
See application file for complete search history.

(56) References Cited

U.S. PATENT DOCUMENTS 6,237,921 B1 5/2001 Liotta et al.
8,178,812 B2 5/2012 Martin et al.
(Continued)

FOREIGN PATENT DOCUMENTS

CN 1103007 C 3/2003
CN 201796808 U 4/2011
(Continued)

OTHER PUBLICATIONS

PCT International Search Report and Written Opinion of International Searching Authority mailed Aug. 21, 2023 corresponding to PCT International Application No. PCT/EP2023/064153 filed May 26, 2023.

*Primary Examiner* — Gilbert Y Lee

(57) ABSTRACT

A sealing ring for sealing off a gap, surrounding a rotor shaft, between a rear and a front stator unit, includes an upper left-hand sealing part and a lower right-hand sealing part that is opposite the latter via the rotor shaft, and an upper right-hand sealing part and a lower left-hand sealing part that is opposite the latter via the rotor shaft. Each of the four sealing parts has a circumferentially extending sealing portion, a contact portion arranged at the first end, an angle portion arranged at the opposite end and an overlapping portion adjacent to the angle portion, wherein in each case two contact portions and two overlapping portions overlap respective adjacent sealing parts.

15 Claims, 5 Drawing Sheets

(56) References Cited

U.S. PATENT DOCUMENTS

| | | | | |
|---|---|---|---|---|
| 8,720,901 | B2 | 5/2014 | Kondo et al. | |
| 9,382,846 | B2 | 7/2016 | Milazar | |
| 10,047,618 | B2 | 8/2018 | Hess et al. | |
| 11,359,513 | B2 | 6/2022 | Blessing et al. | |
| 11,365,639 | B2 | 6/2022 | Krützfeldt et al. | |
| 2010/0237571 | A1* | 9/2010 | Durocher | F16J 15/0887 277/631 |
| 2015/0056068 | A1 | 2/2015 | Wiebe | |
| 2020/0291806 | A1 | 9/2020 | McLaughlin et al. | |

FOREIGN PATENT DOCUMENTS

| | | | |
|---|---|---|---|
| CN | 206163401 | U | 5/2017 |
| DE | 102013219024 | A1 | 4/2015 |
| EP | 3885535 | A1 | 9/2021 |
| JP | H0875007 | A | 3/1996 |
| JP | 2013532258 | A | 8/2013 |
| JP | 2016080112 | A | 5/2016 |
| JP | 2020510782 | A | 4/2020 |
| WO | 2008093849 | A1 | 8/2008 |
| WO | 2009106731 | A2 | 9/2009 |

* cited by examiner

FIG 5
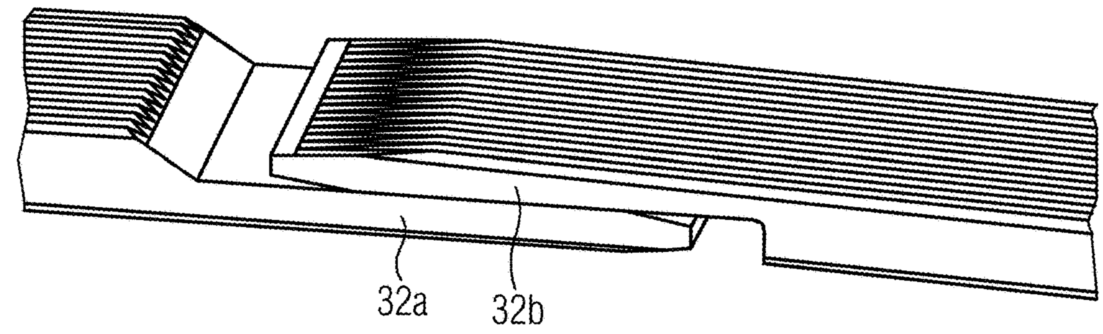
FIG 6
FIG 7
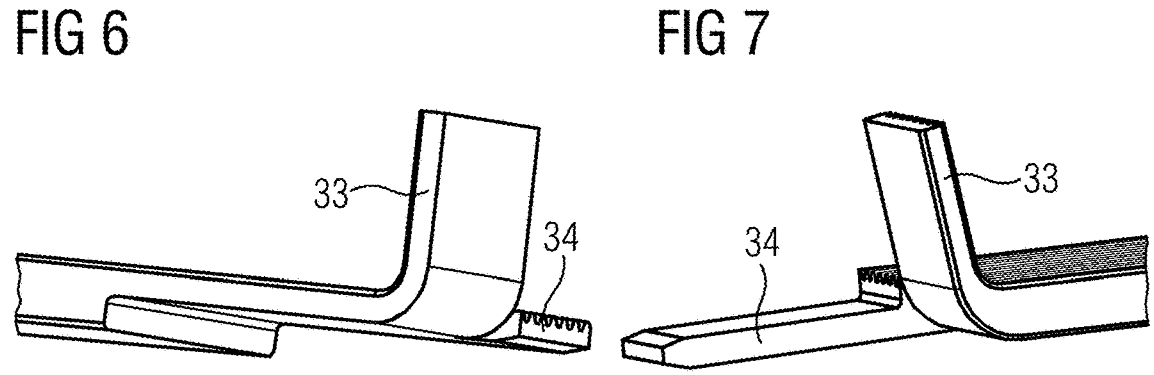
FIG 8
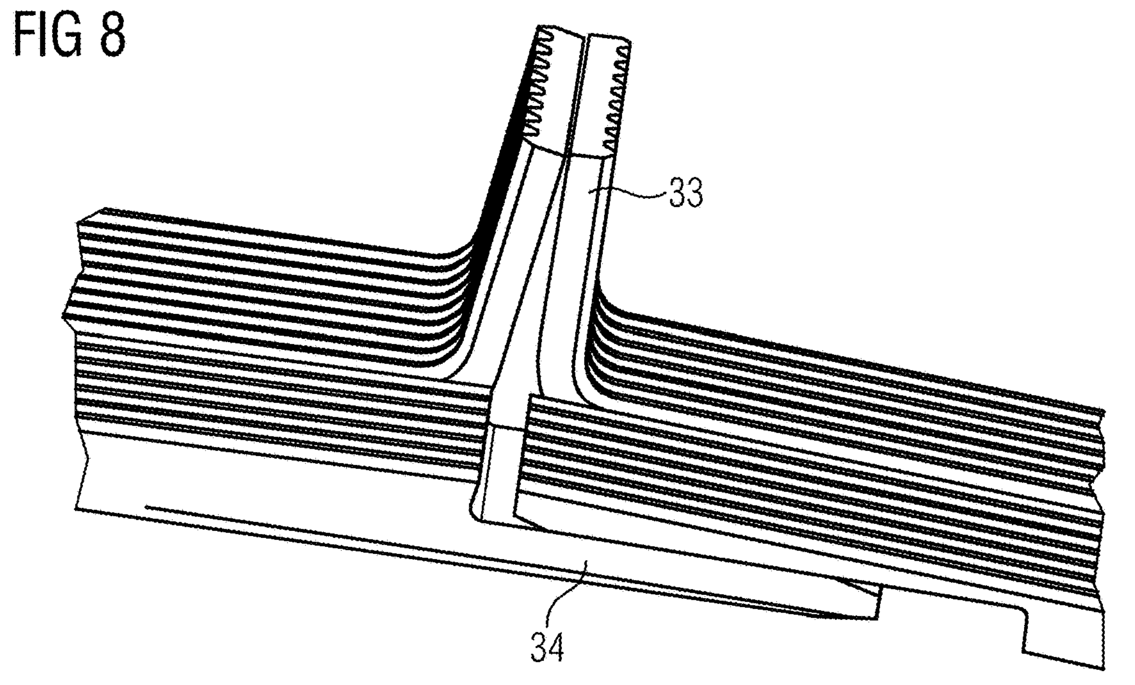

SEALING RING HAVING OVERLAPPING SEALING PARTS, AND STATOR ARRANGEMENT HAVING SAME

FIELD OF INVENTION

The invention relates to a sealing ring for sealing off a gap between a front stator unit and a rear stator unit in a gas turbine.

BACKGROUND

Gas turbines are formed by a plurality of axially successive segments. In the stationary structure, a vane ring comprising stationary guide vanes forms a stator unit, for example. There is an encircling gap between this stator unit and a stator unit in front and behind. To avoid the entry of hot gas from the flow path of the gas turbine or an impermissible escape of cooling air through the gap, it is generally necessary to provide a sealing ring in the gap.

Various modes of construction for corresponding sealing rings are known from the prior art. Normally, flat segmented steel strips that engage on both sides in the adjacent stator units are employed for this purpose. Although various solutions for circumferential securing of the sealing ring and for reducing leaks between the successive parts of the sealing ring are known, there is no solution that is entirely satisfactory, even if suitable.

SUMMARY

It is therefore the object of the present invention to make available an improved solution for a sealing ring which, on the one hand, allows securing in the circumferential direction and, on the other hand, reduces leakage between the individual elements of the sealing ring to a minimum. At the same time, it is important to enable simple and quick assembly.

The stated object is achieved by means of an embodiment according to the invention of a sealing ring according to the teaching of claim 1. A stator arrangement according to the invention using a corresponding sealing ring is specified in claim 10. Advantageous embodiments form the subject matter of the dependent claims.

The sealing ring of the type in question was used to seal off an encircling gap between a front stator unit arranged on a front side and a rear stator unit arranged on a rear side. The context here is irrelevant for the sealing ring in the first instance. In a particularly preferred use, the sealing ring is employed in a gas turbine. Here, the sealing ring has a plurality of sealing parts.

The sealing ring defines a rotor axis, wherein a dividing plane is provided by the rotor axis. The upper side which is the first side of a horizontal plane is situated on one side of the dividing plane, and the lower side which is the second side of the horizontal plane is situated on the opposite side. Perpendicularly to the dividing plane, the sealing ring can furthermore be divided into a left-hand side which is a first side of a vertical plane and a right-hand side which is a second side of the vertical plane situated on the opposite side. To this extent, the sealing ring can be divided circumferentially into four sectors: upper right-hand side, lower right-hand side, lower left-hand side and upper left-hand side.

In this case, the sealing ring according to the invention requires an upper left-hand sealing part which is a first sealing part in the upper left-hand sector and a lower right-hand sealing part which is a second sealing part, situated opposite across the rotor axis, in the lower right-hand sector, and an upper right-hand sealing part which is a third sealing part in the upper right-hand sector and a lower left-hand sealing part which is a fourth sealing part in the lower left-hand sector. There is no requirement here for each of the sealing parts to be situated completely in the respective sector. It is at least necessary here that each of these four sealing parts has a sealing portion and an angle portion and an overlapping portion.

Here, the sealing portion extends over the majority of the length of the sealing part in the circumferential direction. In this case, the sealing portion has a sealing thickness in the radial direction. Transversely thereto in the axial direction, the sealing portion has a sealing width which corresponds to at least 5 times the sealing thickness. This gives the flat configuration of the sealing portion.

The contact portion adjoins the sealing portion at one end and likewise extends in the circumferential direction. In this case, the contact portion has the corresponding constant sealing width. However, in respect of the sealing thickness, the thickness of the contact portion is reduced to at most 0.6 times the sealing thickness.

The angle portion is arranged at the opposite end of the sealing portion. In contrast to the contact portion, however, this is arranged only on the rear side and extends in the axial direction over approximately half the width of the sealing part. In this case, the angle portion should likewise have a smaller thickness of at most 0.6 times the sealing thickness. In contrast to the contact portion, it is necessary for the angle portion to extend around an axially aligned bending axis relative to the extent of the sealing portion, being angled in an approximately radial direction. Here, the radial extent of the angle portion should preferably correspond to at least half the sealing width and no more than the sealing width. For production, a free end can preferably be bent over in the radial direction.

The overlapping portion is arranged adjacent to the angle portion on the front side. In this case, the overlapping portion should be embodied in a manner similar to the contact portion. Thus, the overlapping portion at the end of the sealing portion extends in the circumferential direction and likewise has at most 0.6 times the sealing thickness. In accordance with the arrangement adjacent to the angle portion, however, the width in the axial direction is likewise reduced to approximately half the width of the sealing part.

By virtue of the new shape with the specific arrangement of the contact portions and opposite the angle portion and the overlapping portion, advantageous sealing is enabled, on the one hand, and easy assembly is ensured, on the other hand.

In this case, provision is advantageously made for in each case two contact portions of adjacent sealing parts to overlap. Obviously, it is necessary here that an outer contact portion must lie on the radially outer side and an adjacent inner contact portion must lie on the radially inner side.

It is furthermore envisaged here that the contact portions of the left-hand sealing parts, i.e. the inner contact portion of the upper or lower left-hand sealing part, overlaps the outer contact portion of the lower or upper left-hand sealing part, and the contact portions of the right-hand sealing parts, i.e. the inner contact portion of the upper or lower right-hand sealing part, overlap the outer contact portion of the lower and upper right-hand sealing part, respectively.

Similarly, provision is advantageously made for in each case two overlapping portions of adjacent sealing parts to overlap. Obviously, it is required here that an outer overlapping portion must lie on the radially outer side and an adjacent inner overlapping portion must lie on the radially inner side.

By virtue of the embodiment of the sealing parts with the overlapping contact portions at one end and of the combination of an angle portion and an overlapping portion at the other end, both securing in the circumferential direction is made possible and leakage can be kept within permissible limits. This embodiment is furthermore advantageous in terms of production.

Which contact portion is arranged radially on the inside and which is arranged radially on the outside is irrelevant in the first instance. In view of the direction of rotation of a rotor arranged correctly within the sealing ring, however, it is advantageous if the free end of the radially inner contact portion points in the direction of rotation. It follows from this that the free end of the radially outer contact portion would point counter to the direction of rotation.

This applies analogously to the inner overlapping sections and the outer overlapping sections in respect of the direction of rotation.

Thus, in the advantageous embodiment, the arrangement of the inner contact portion and of the outer contact portion on the left-hand and right-hand upper and lower sealing parts depends on the orientation and a direction of rotation.

If the sealing ring is viewed from the rear side to the front side in the axial direction and if the correct direction of rotation is clockwise, the left-hand lower sealing part and the right-hand upper sealing part advantageously have the inner contact portion and, opposite these, the left-hand upper sealing part and the right-hand lower sealing part advantageously have the outer contact portion. In this case, the inner contact portions point in the clockwise direction, and the outer contact portions point in the counterclockwise direction.

Irrespective of the direction of rotation and of the arrangement of the overlapping inner and outer contact portions, it is advantageous in all cases if the overlapping contact portions on the right-hand side are arranged opposite the contact portions on the left-hand side across the rotor axis.

In principle, it would be possible to arrange the contact portion in the region of a dividing plane. Here, the dividing plane is defined by the rotor axis, wherein, in accordance with the intended use, the adjacent stator units are divided by the dividing plane into an upper unit and a lower unit to allow installation of a rotor. It should be noted that there is no requirement for the structural separation of the stator units to occur exactly in the dividing plane; on the contrary, the stator units may be taken apart along the dividing plane.

Taking into account a dividing plane for the intended use, however, it is particularly advantageous if the contact portions are arranged above the dividing plane on one side and below it on the opposite side. Viewed in the direction of rotation, the contact portions should in this case each be arranged ahead of the dividing plane. In accordance with the above example with the clockwise direction of rotation, it is thus advantageous if contact portions on the left-hand side are situated below the dividing plane and the contact portions on the right-hand side are situated above the dividing plane.

The advantageous arrangement of the inner contact portions and of the outer contact portions together with the positioning of the contact portions slightly offset to the dividing plane, i.e. rotated about the rotor axis, enables particularly advantageous mounting of an upper half of the stator units on the lower half of the stator units. In this case, reliable fitting of the sealing parts into the respectively opposite stator half in a manner offset with respect to the dividing plane is made possible without the risk of damaging the sealing parts during the process of fitting the halves.

Basically, but especially in connection with the arrangement of the contact portions ahead of the dividing plane, it is furthermore particularly advantageous if the extent in the circumferential direction of the sealing part having the respective inner contact portion is less than the extent in the circumferential direction of the sealing parts having the overlapping outer contact portion. With this embodiment, it is possible, for example, to enable arrangement of the contact portions outside the dividing plane and, opposite these, the same arrangement of all the angle portions in the respective sector.

In particular, the angle portions should enable circumferential securing of the respective sealing part. Taking into consideration adjacent sealing parts, it is advantageous here if, for each angle portion of a sealing part, an opposite angle portion of an adjacent sealing part is arranged. Thus, two sealing parts with the associated angle portions can be secured in the circumferential direction at the same location.

In this case, it is furthermore particularly advantageous for the reduction of leakage if the adjacent angle portions rest against one another by means of the respective free end. It is thus possible to avoid a gap between the mutually opposite angle portions. In order to permit compensation of thermal expansion in the circumferential direction (i.e. a change in the length of the sealing portion relative to the change in the size of the adjacent front or rear stator unit), it is furthermore advantageous here if, in the initial state, the angle portions are spaced apart from one another in the region of their attachment to the respective sealing portion. To enable compensation of thermal expansion, it is furthermore advantageous here to provide for elastic deformation of the angle portions.

Although it would be sufficient to employ four sealing parts around the circumference, it is advantageous if in addition an upper main part which is a first main part and a lower main part which is a second main part are present as further sealing parts in the sealing ring. In this case, it is necessary for each of the main parts likewise to have a sealing portion and, at one end of the sealing portion, an angle portion and an overlapping portion. In contrast to the left-hand and right-hand sealing parts, however, it is furthermore advantageous to provide for the two main parts likewise to have an angle portion and an overlapping portion at the opposite end of the sealing portion as well. In respect of the embodiment of the sealing portion, of the angle portion and of the overlapping portion, the same applies as has been explained above in respect of the left-hand and right-hand sealing parts.

In this case, it is furthermore advantageous if the sealing portion of the respective main parts extends over at least 120° in the circumferential direction. It is particularly advantageous if the sealing portions extend over at least 150° in the circumferential direction.

The sealing ring according to the invention makes it possible to implement a stator arrangement according to the invention. In this case, the stator arrangement of the type in question first of all has a front stator unit on a front side and a rear stator unit on a rear side. Between the front stator unit and the rear stator unit there is a gap, in which a sealing ring is arranged. According to the invention, the sealing ring is an embodiment according to the above description.

The embodiment of the front stator unit and of the rear stator unit is irrelevant in the first instance, wherein the embodiment can be used to advantage, in particular, when the front stator unit comprises a plurality of stator segments arranged in a manner distributed around the circumference. Similarly, use is advantageous if the rear stator unit comprises a plurality of stator segments arranged in a manner distributed around the circumference.

In this case, it is furthermore particularly advantageous if at least four of the rear stator segments each have a cutout, wherein the cutout is arranged on the side facing the gap and in each case at least one angle portion engages therein. Irrespective of this, provision can also be made for other or all stator segments to have the same cutout.

In the case of the segmented stator segments, provision can be made on the left-hand side and on the right-hand side for in each case one stator segment to extend on both sides over the dividing plane. If the stator unit is then divided into an upper half and a lower half, the stator segments situated in the region of the dividing plane are to be mounted either in the upper half or in the lower half.

As a particularly preferred option, allocation to the upper half or the lower half is made dependent on the half in which the sealing part that has the outer contact portion is mounted. In this case, the two rear stator segments adjoining the sealing parts with the outer contact portions on the left-hand side and on the right-hand side should be mounted in the same halves in each case.

In the case of a clockwise direction of rotation and the embodiment of the upper left-hand sealing part with the outer contact portion, the rear left-hand stator segment which is intersected by the dividing plane should preferably be mounted in the upper half on the left-hand side. Similarly, for the embodiment with the lower right-hand sealing part with the outer contact portion, the rear right-hand stator segment that is intersected by the dividing plane is mounted in the lower half.

In order to enable advantageous fitting of the upper half and of the lower half of split stator units to the split sealing ring, it is furthermore advantageous if, adjacent to the rear stator segments which are intersected by the dividing plane, the outer contact portion of the sealing part on the right-hand side and on the left-hand side extends in the circumferential direction beyond the dividing plane and furthermore beyond the total width of the adjacent stator segment.

In the illustrative clockwise direction of rotation with the upper left-hand sealing part with the outer contact portion and a stator segment at the rear on the left-hand side, which is mounted in an upper half and extends over the dividing plane, it is correspondingly advantageous if the upper left-hand sealing part extends downward beyond the dividing plane and to a point below the stator segment arranged adjacent to the dividing plane.

Similarly, in the illustrative clockwise direction of rotation with the lower right-hand sealing part with the outer contact portion and a stator segment at the rear on the right-hand side, which is mounted in a lower half and extends over the dividing plane, it is correspondingly advantageous if the lower right-hand sealing part extends upward beyond the dividing plane and to a point above the stator segment arranged adjacent to the dividing plane.

BRIEF DESCRIPTION OF THE DRAWINGS

An illustrative embodiment of a sealing ring according to the invention and of the arrangement thereof in a gap between the front and rear stator units is sketched in the following figures, of which:

FIG. 5 shows the contact portion of the sealing parts;

FIG. 6 shows the angle portion and the overlapping portion on the left-hand lower sealing part;

FIG. 7 shows the angle portion and the overlapping portion on the left-hand upper sealing part;

FIG. 8 shows the connection between two angled portions and overlapping portions;

DETAILED DESCRIPTION

Figure 1:
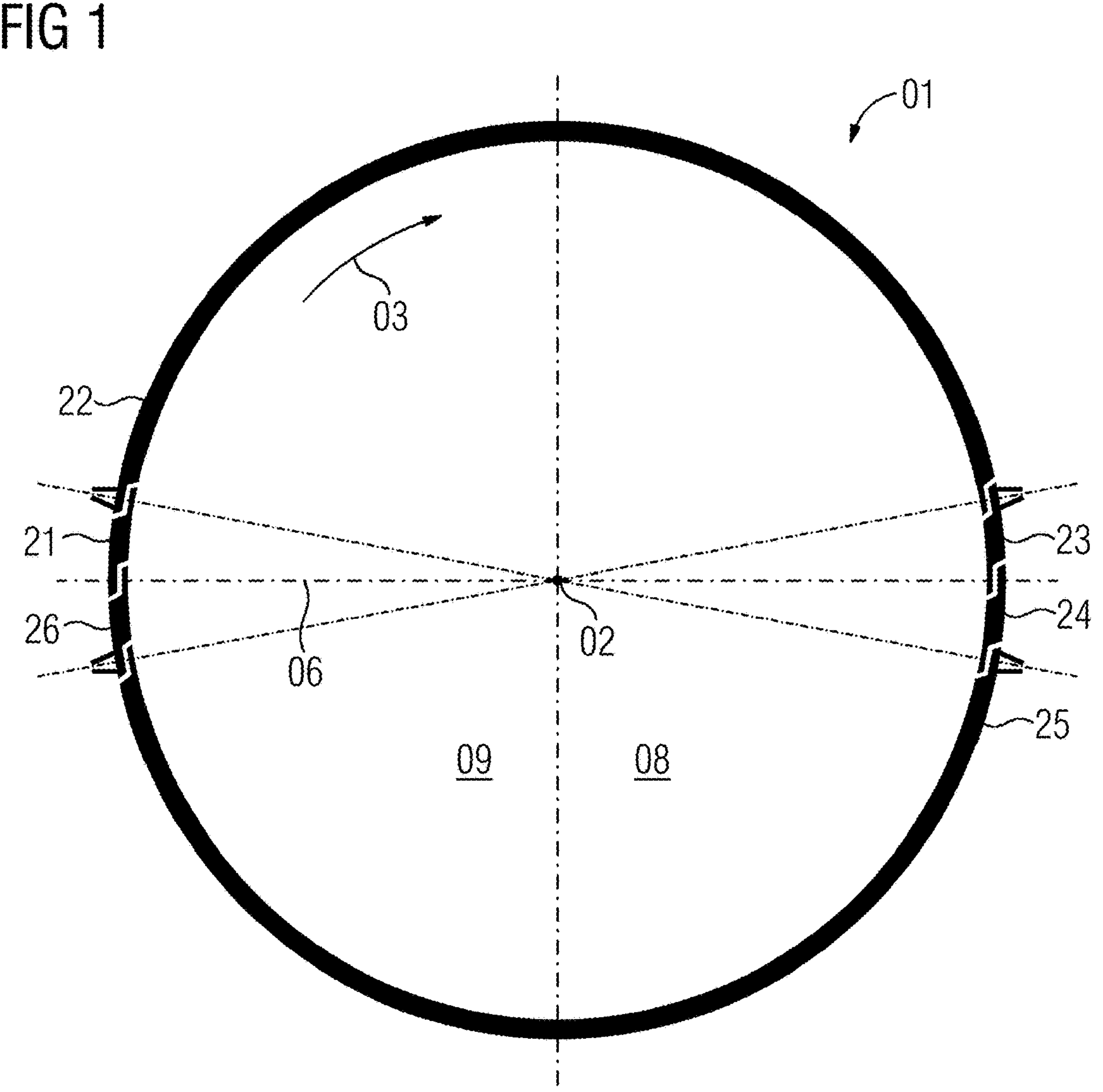
FIG. 1 schematically shows an illustrative sealing ring comprising six sealing parts.

FIG. 1 shows schematically an illustrative embodiment of a sealing ring 01 according to the invention, said ring 01 comprising six sealing parts. The sealing ring 01 is shown as viewed in the axial direction, wherein the horizontal center forms a dividing plane 06, and, in the illustration, the left-hand side 09 is situated on the left of the rotor axis 02 and the right-hand side 08 is situated on the right-hand side of the rotor axis 02. In this exemplary embodiment, a clockwise direction of rotation 03 of a rotor arranged correctly within the sealing ring 01 is assumed. In this exemplary embodiment it is furthermore envisaged that FIG. 1 provides a view looking from the rear side 04 to the front side 05.

First of all, the sealing ring 01 comprises, as essential components, the left-hand upper sealing part 21 and, situated opposite across the rotor axis 02, the right-hand lower sealing part 24. These are respectively arranged adjacent to a left-hand lower sealing part 26 and a right-hand upper sealing part 23 situated opposite the latter.

In addition, this exemplary embodiment comprises an upper main part 22, which 22 extends from the left-hand upper sealing part 21 as far as the right-hand upper sealing part 23. Similarly, there is a lower main part 25 on the lower side between the right-hand lower sealing part 24 and the left-hand lower sealing part 26.

Figure 2:
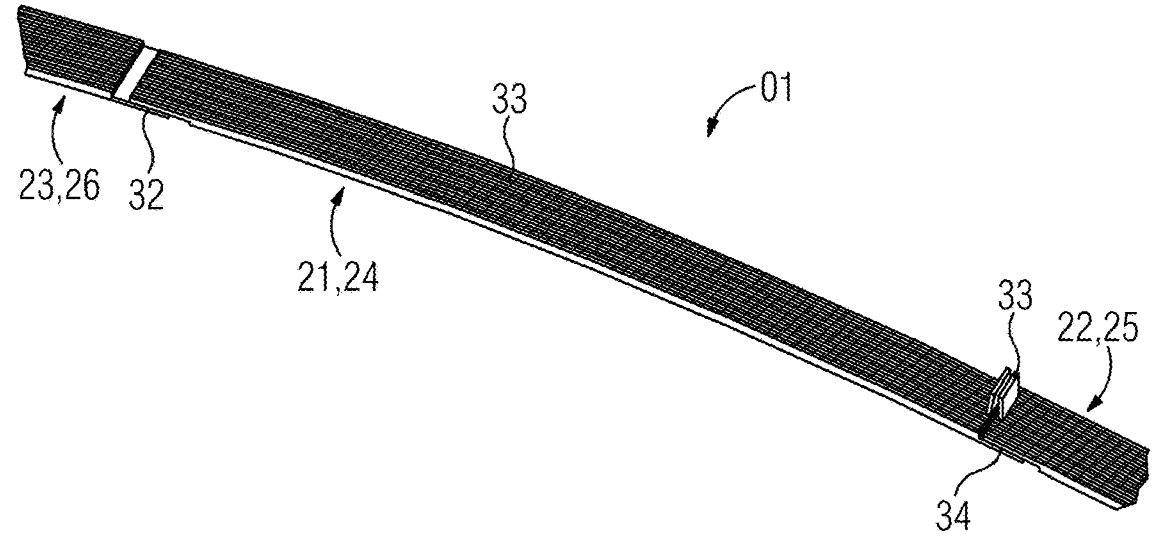
FIG. 2 shows a perspective view of a portion of the sealing ring.
Figure 3:
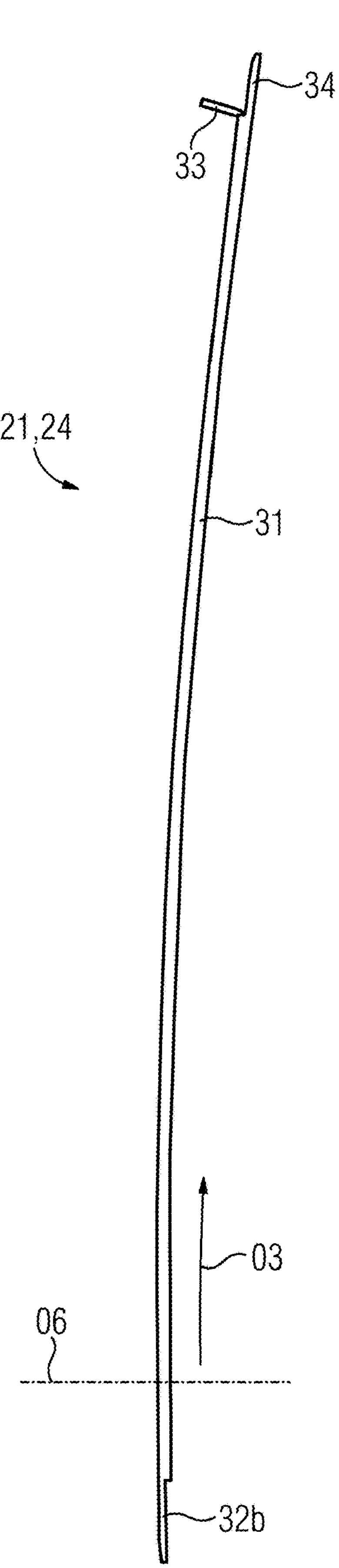
FIG. 3 shows a side view of the left-hand upper sealing part.
Figure 4:
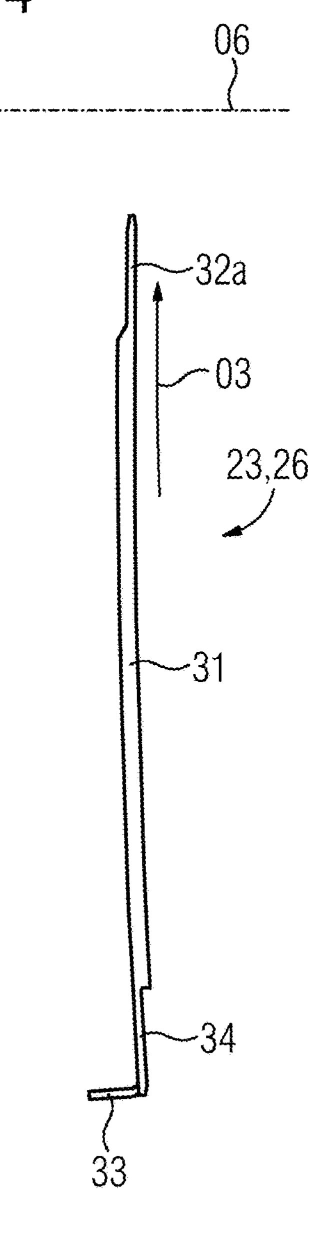
FIG. 4 shows a side view of the left-hand lower sealing part.

For the further description of the left-hand and right-hand sealing parts 21, 23, 24 and 26, reference is made to the subsequent FIGS. 2, 3 and 4. FIGS. 2 and 3 illustrate by way of example the left-hand upper sealing part 21, which is of identical design to the right-hand lower sealing part 24. In contrast, FIG. 4 illustrates the left-hand lower sealing part 26, which 26 is of identical design to the oppositely situated right-hand upper sealing part 23.

It can be seen that these sealing parts 21, 23, 24 and 26 have a sealing portion 31 over a substantial part of their length in the circumferential direction. This sealing portion 31 has a sealing thickness in the radial direction and a sealing width in the axial direction.

A contact portion 32 is in each case arranged at one end of the sealing portion 31. This 32 likewise extends in the circumferential direction with the sealing width. It is envisaged here that respective contact portions 32 of adjacent sealing parts 21, 26 and 23, 24 overlap—cf. especially FIG. 5. Accordingly, it is necessary for there to be an outer contact portion 32*b* on a radially outer side on one sealing part 21, 24 of the adjacent sealing parts 21, 26 and 23, 24, and for an inner contact portion 32*a* to be arranged on a radially inner side on the other sealing part 23, 24.

Referring to FIG. 1, it can be seen that the contact portions 32 are provided in the region of the dividing plane 06.

Situated opposite the contact portions 32 on the sealing parts 21, 26 and 23, 24 there is an angle portion 33, which is arranged on the rear side 04 and is approximately half as wide as the seal. In this case, the angle portion 33 extends with a reduced thickness approximately in a radial direction, wherein the extent in the radial direction corresponds approximately to the width of the angle portion 33—cf. especially FIGS. 6 and 7.

It is furthermore envisaged that for each angle portion 33 of a sealing part 21-26 there is an opposite angle portion 33 of an adjacent sealing part 21-26—see especially FIG. 8. In this case, it is furthermore envisaged that the opposite angle portions 33 rest against one another at their free end, whereas the angle portions 33 are spaced apart from one another in the region of attachment to the respective sealing portion 31.

Adjacent to the angle portion 33 in the axial direction there is in each case an overlapping portion 34 at the end of the sealing portion 31. Like the contact portions 32, this has a reduced thickness but is only approximately half as wide as the seal. Here too, it is envisaged that two overlapping portions of adjacent sealing parts 21-26 overlap one another. Accordingly, as with the contact portions 32, there is a need for alternate inner and outer overlapping portions 34 on the sealing parts 21-26. In this regard, see also FIGS. 6-8.

Figure 9:
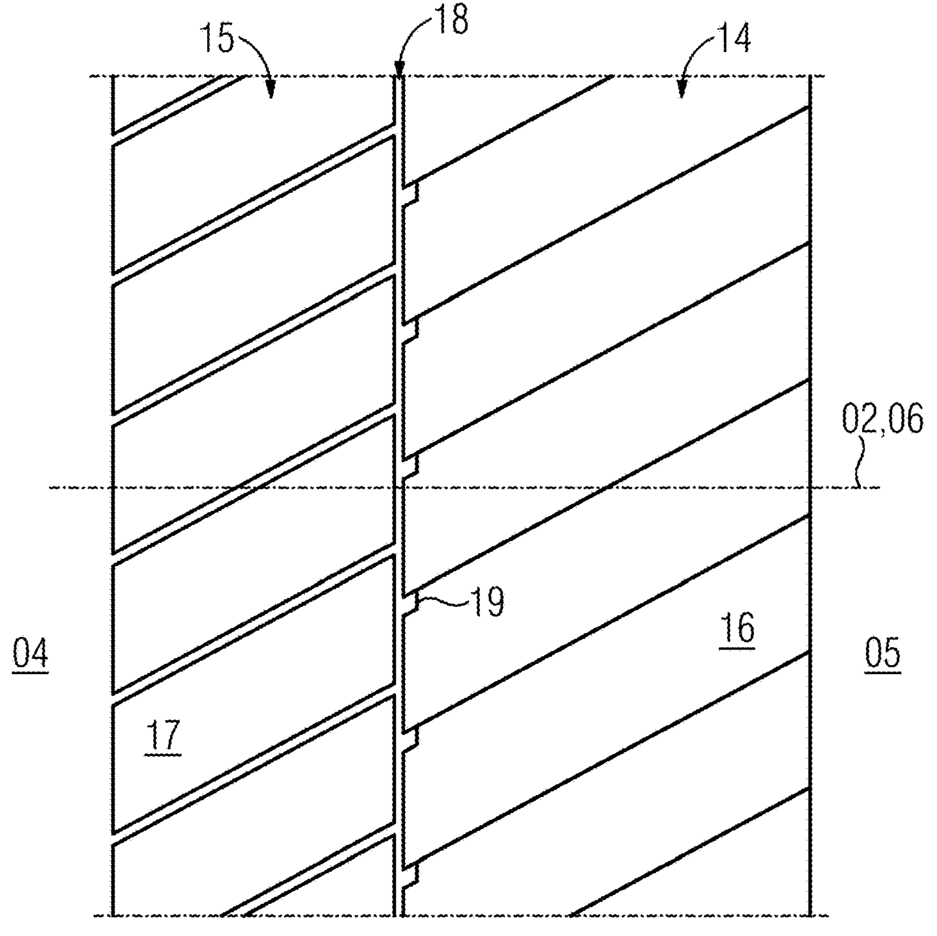
FIG. 9 shows a detail of the front stator unit and the rear stator unit.

FIG. 9 schematically shows a detail of a stator arrangement comprising a rear stator unit 14 and a front stator unit 15. The formation of the stator units from a plurality of rear stator segments 16 and front stator segments 17 is evident. Between the rear stator unit 14 and the front stator unit 15 there is an encircling gap 18, in which the illustrative sealing ring 01—as described above—is arranged (in this view, the sealing ring 01 is not illustrated).

At least it is apparent that the stator segments have a configuration that is inclined relative to the rotor axis 02. As a result, individual stator segments 16, 17 are intersected by the dividing plane 06. In allocating them to an upper half and a lower half, therefore, arrangement of the stator segments 16, 17 present in the region of the dividing plane 06 in either the upper half or the lower half is required.

The figure also shows that the rear stator segments 16 each have a cutout 19 in a corner of the component facing the gap 18.

Figure 10:
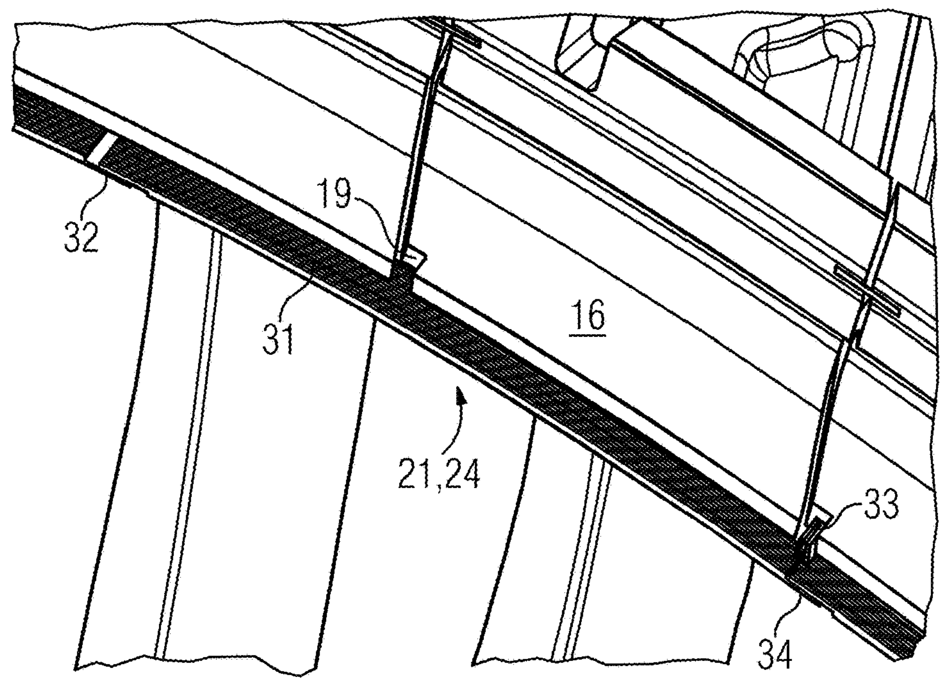
FIG. 10 shows a detail of the sealing ring mounted in the rear stator unit.

In FIG. 10, the arrangement of the sealing ring 01 on the rear stator unit 14 is depicted in a detail view. Once again, the rear stator segments 16 with the respective cutouts 19 can be seen.

Here, the axially rear edge portion of the sealing ring 01 is accommodated in an axially open groove in the rear stator segments 16. This illustration shows the arrangement of the upper left-hand sealing part 21 and the lower right-hand sealing part 24 with the sealing portion 31, the contact portion 32 situated at the left-hand end, and the angle portion 33 arranged at the right-hand end, as well as overlapping portion 34. Here, the opposite overlapping portions 33 are secured in the circumferential direction by engagement in the cutout 19.

This illustration furthermore shows that the outer contact portions 32*b* of the sealing parts 21, 24 extend in the circumferential direction beyond the width of a rear stator segment 16, with the result that, when viewed in the circumferential direction, the overlapping contact portions 32 of the adjacent sealing parts 21, 26; 23, 24 are arranged in the region of a stator segment 16 at a distance from the dividing joints between the individual stator segments 16.

Figure 11:
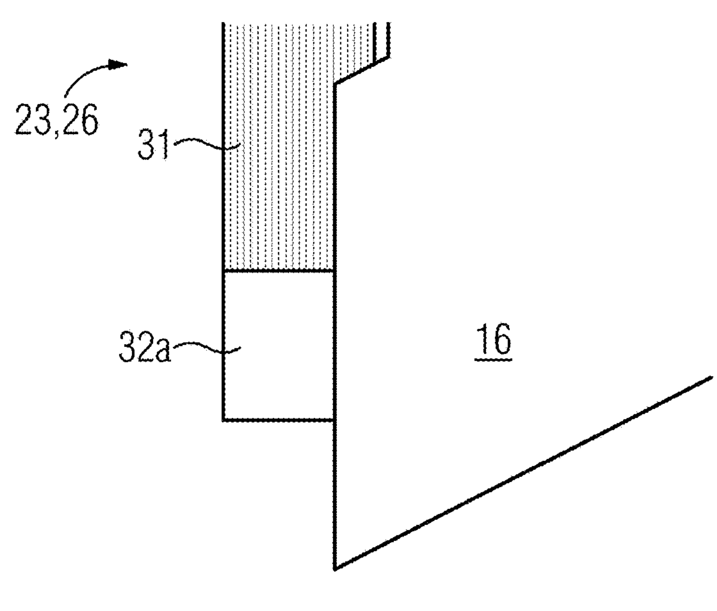
FIG. 11 shows the division of the sealing ring and of the rear stator unit into an upper half and a lower half.
Figure 11:
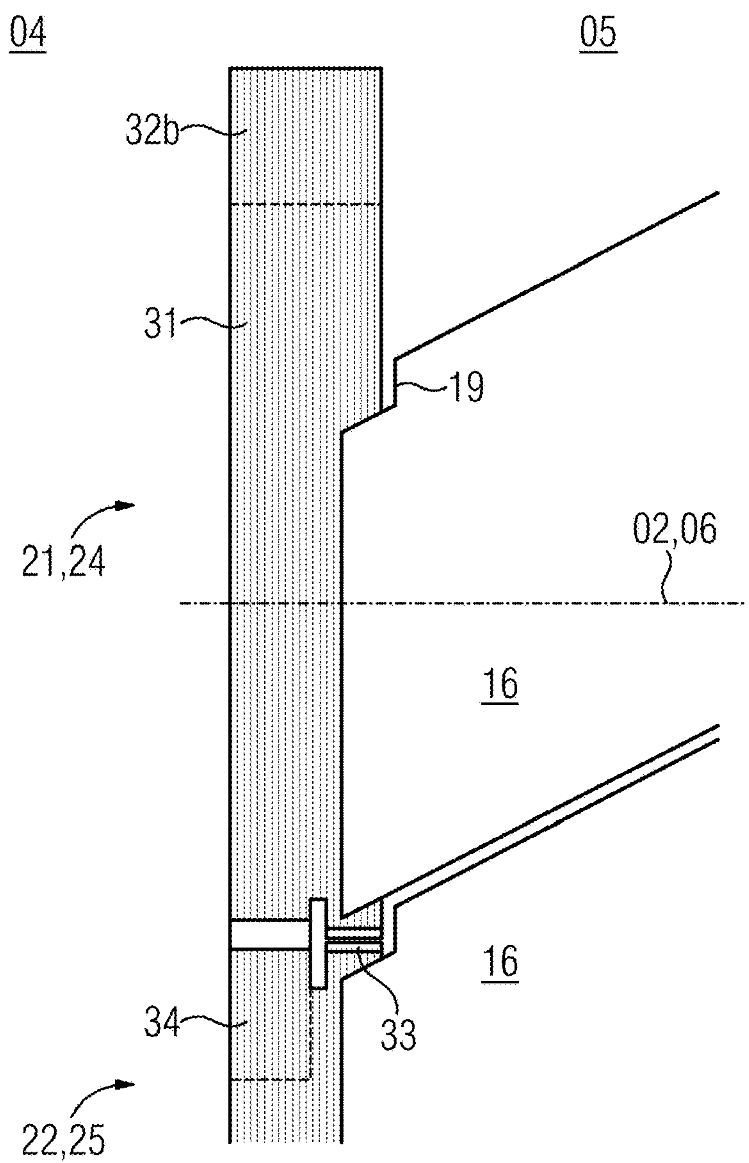

FIG. 11 shows the division of the sealing ring 01 and of the rear stator unit 14 into an upper half and a lower half. This division is necessary insofar as the housing surrounding a rotor, and thus the sealing ring 01 and the stator units 14, 15, must be divided for the installation of a rotor.

In this exemplary embodiment, it is envisaged that the sealing part 21, 24 is mounted with the outer contact portion 32*b* in the half in which an adjacent rear stator segment 16 that is intersected by the dividing plane 06 in the region of the gap 08 is also mounted. Following the dividing plane 06 in the direction of rotation 03, the angle portion 33 of the sealing part 21, 24 is secured in the cutout 19 between adjacent rear stator segments 16. In this case, the sealing part 21, 24 extends counter to the direction of rotation 03 beyond the rear stator segment 16 adjoining the dividing plane 06.

In contrast, the sealing part 23, 26 with the inner contact portion 32*a*, which is adjacent in the circumferential direction counter to the direction of rotation 03, is situated in the respective other half.

At the bottom of the image, the illustration in FIG. 11 shows the lower half with the lower right-hand sealing part 24 and, at the top in the image, it shows the beginnings of the upper half with the upper right-hand sealing part 23. With reference to the image, if viewing the left-hand side, the lower half of the sealing ring 01 and of the rear stator unit 14 would be at the top in the image and the upper half thereof would be at the bottom in the image.

The invention claimed is:

1. A sealing ring for sealing off a gap, surrounding a rotor axis, between a rear stator unit on a rear side and a front stator unit on a front side, the sealing ring comprising:
- a horizontal plane containing the rotor axis and a vertical plane containing the rotor axis;
- a first sealing part defined on a first side of the horizontal plane and a first side of the vertical plane;
- a second sealing part defined on a second side of the horizontal plane opposite to the first side of the horizontal plane and a second side side of the vertical plane opposite to the first side of the vertical plane, the second sealing part situated opposite to the first sealing part across the rotor axis;
- a third sealing part defined on the first side of the horizontal plane and the second side of the vertical plane; and
- a fourth sealing part defined on the second side of the horizontal plane and the first side of the vertical plane, the fourth sealing part situated opposite to the third sealing part across the rotor axis, wherein each of these four sealing parts comprises:
- a sealing portion, which extends in the circumferential direction and has a sealing thickness in the radial direction and a sealing width in the axial direction which is at least 5 times greater;
- a contact portion, which is arranged at a first end of the sealing portion and extends with the sealing width in the circumferential direction and has a thickness of at most 0.6 times the sealing thickness;
- an angle portion, which is arranged on the rear side at the opposite end of the sealing portion and extends over a length of at least 0.5 times the sealing width in the radial and axial directions and has a thickness less than 0.6 times the sealing thickness; and
- an overlapping portion, which is arranged on the front side adjacent to the angle portion and extends in the circumferential direction and has a thickness of at most 0.6 times the sealing thickness.

2. The sealing ring as claimed in claim 1, wherein inner contact portions are arranged on the side facing the rotor axis, and outer contact portions are arranged on the radially outer side so as to overlap with a respective inner contact portion; and/or wherein the contact portions of the first sealing part and the fourth sealing part overlap and the contact portions of the second sealing part and the third sealing part overlap.

3. The sealing ring as claimed in claim 2, wherein the contact portions on the second side of the vertical plane are arranged opposite the contact portions on the first side of the vertical plane across the rotor axis.

4. The sealing ring as claimed in claim 3, wherein, in the correct installation position, the contact portions are arranged ahead of a dividing plane in the direction of rotation.

5. The sealing ring as claimed in claim 2, wherein the extent in the circumferential direction of the sealing parts having the inner contact portions is less than the extent of the sealing parts having the outer contact portions.

6. The sealing ring as claimed in claim 1, wherein inner contact portions are arranged on the side facing the rotor axis, and the free ends thereof point in a direction of rotation of a rotor arranged correctly within the sealing ring, and outer contact portions are arranged on the radially outer side so as to overlap with the respective inner contact portion, and the free ends thereof point counter to the direction of rotation.

7. The sealing ring as claimed in claim 1, wherein, for each angle portion of a sealing part, an opposite angle portion of an adjacent sealing part is arranged.

8. The sealing ring as claimed in claim 7, wherein the opposite angle portions are in contact at the radially outer free end and spaced apart from one another in the region of the connection to the respective sealing portion.

9. The sealing ring as claimed in claim 1, further comprising a first main part between the first sealing part and the third sealing part and a second main part between the second sealing part and the fourth sealing part, each comprising a sealing portion, which in each case extends over at least 120° in the circumferential direction; and two angle portions, which are each arranged on the rear side at one end of the sealing portion; and two overlapping portions, which are each arranged on the front side, adjacent to an angle portion.

10. The sealing ring as claimed in claim 9, wherein the sealing portion, which in each case extends over at least 150° in the circumferential direction.

11. A stator arrangement comprising:

a rear stator unit on a rear side;

a front stator unit on a front side; and a sealing ring surrounding a rotor axis and arranged in between the rear stator unit and the front stator unit, the sealing ring comprising:

a horizontal plane containing the rotor axis and a vertical plane containing the rotor axis;

a first sealing part defined on a first side of the horizontal plane and a first side of the vertical plane;

a second sealing part defined on a second side of the horizontal plane opposite to the first side of the horizontal plane and a second side of the vertical plane opposite to the first side of the vertical plane, the second sealing part situated opposite to the first sealing part across the rotor axis;

a third sealing part defined on the first side of the horizontal plane and the second right hand side of the vertical plane; and a fourth sealing part defined on the second side of the horizontal plane and the first side of the vertical plane, the fourth sealing part situated opposite across the rotor axis, wherein each of these four sealing parts comprises:

a sealing portion, which extends in the circumferential direction and has a sealing thickness in the radial direction and a sealing width in the axial direction which is at least 5 times greater;

a contact portion, which is arranged at a first end of the sealing portion and extends with the sealing width in the circumferential direction and has a thickness of at most 0.6 times the sealing thickness;

an angle portion, which is arranged on the rear side at the opposite end of the sealing portion and extends over a length of at least 0.5 times the sealing width in the radial and axial directions and has a thickness less than 0.6 times the sealing thickness; and an overlapping portion, which is arranged on the front side adjacent to the angle portion and extends in the circumferential direction and has a thickness of at most 0.6 times the sealing thickness.

12. The stator arrangement as claimed in claim 11, wherein the rear stator unit comprises a plurality of rear stator segments arranged in a manner distributed around the circumference; and/or wherein the front stator unit comprises a plurality of front stator segments arranged in a manner distributed around the circumference.

13. The stator arrangement as claimed in claim 12, wherein at least four of the rear stator segments each have a cutout on the side facing the gap, wherein the angle portions engage in the cutouts.

14. The stator arrangement as claimed in claim 12, wherein the rear stator segments which are intersected by the dividing plane are mounted in the same half in which the adjacent sealing part with the outer contact portion is arranged.

15. The stator arrangement as claimed in claim 14, wherein the first sealing part and the second sealing part, which have the outer contact portion, extend beyond the dividing plane and beyond the width in the circumferential direction of the adjacent rear stator segment.

* * * * *